United States Patent
Griffin et al.

(10) Patent No.: US 11,548,626 B2
(45) Date of Patent: Jan. 10, 2023

(54) TUNED MASS DAMPER FOR AIRCRAFT

(71) Applicant: The Boeing Company, Chicago, IL (US)

(72) Inventors: Steven F Griffin, Kihei, HI (US); Robert J Atmur, Whittier, CA (US); Adam R Weston, Brier, WA (US)

(73) Assignee: The Boeing Company, Chicago, IL (US)

(*) Notice: Subject to any disclaimer, the term of this patent is extended or adjusted under 35 U.S.C. 154(b) by 847 days.

(21) Appl. No.: 16/509,155

(22) Filed: Jul. 11, 2019

(65) Prior Publication Data
US 2021/0009260 A1    Jan. 14, 2021

(51) Int. Cl.
*B64C 27/00* (2006.01)
*B64C 39/02* (2006.01)

(52) U.S. Cl.
CPC .......... *B64C 27/001* (2013.01); *B64C 39/024* (2013.01); *B64C 2201/027* (2013.01); *B64C 2201/042* (2013.01); *B64C 2201/108* (2013.01)

(58) Field of Classification Search
CPC ....... B64C 27/001; B64C 27/08; B64C 27/04; B64C 39/024; B64C 2201/027; B64C 2201/042; B64C 2201/108; B64C 2201/14; F16F 2230/0052; F16F 9/306
See application file for complete search history.

(56) References Cited

U.S. PATENT DOCUMENTS

| | | | | |
|---|---|---|---|---|
| 3,656,723 A | * | 4/1972 | Piasecki | B64D 1/22 244/2 |
| 3,708,746 A | * | 1/1973 | Willett | G01R 23/00 324/76.47 |
| 6,250,149 B1 | * | 6/2001 | Black | G01K 13/02 73/178 R |
| 6,325,351 B1 | * | 12/2001 | Hale | F16F 9/306 248/603 |
| 7,118,328 B2 | * | 10/2006 | Welsh | B64C 27/001 244/17.27 |
| 8,205,822 B1 | * | 6/2012 | Jameson | B64C 39/024 244/17.11 |
| 9,205,922 B1 | * | 12/2015 | Bouwer | B64C 37/02 |
| 9,421,869 B1 | * | 8/2016 | Ananthanarayanan | B64D 5/00 |
| 9,828,095 B1 | * | 11/2017 | Wilcox | G05D 13/62 |
| 9,938,001 B1 | * | 4/2018 | Parent | B64C 39/024 |

(Continued)

OTHER PUBLICATIONS

A.R.S. Bramwell et al; Bramwell's Helicopter Dynamics; Second edition; 2001.

(Continued)

*Primary Examiner* — Medhat Badawi
(74) *Attorney, Agent, or Firm* — Duft & Bornsen, PC

(57) ABSTRACT

Embodiments herein describe mitigating flexible modes in an airframe of an aircraft by operating a battery for the aircraft as a tuned mass damper. One embodiment comprises an Unmanned Aerial Vehicle (UAV). The UAV includes a flexible airframe, a plurality of propulsors coupled to the flexible airframe that generate thrust for the UAV, a battery that provides electrical power for the plurality of propulsors, and a suspension system that suspends the battery from the flexible airframe and operates the mass of the battery as a tuned mass damper to dampen flexible modes generated in the flexible airframe during flight.

20 Claims, 16 Drawing Sheets

(56) References Cited

U.S. PATENT DOCUMENTS

| | | | | |
|---|---|---|---|---|
| 10,266,120 B2* | 4/2019 | Wilson | | F16F 7/104 |
| 10,577,116 B1* | 3/2020 | Cameron, Jr. | | B64D 31/06 |
| 2002/0171563 A1* | 11/2002 | Djorup | | G01P 5/12 |
| | | | | 340/963 |
| 2005/0201863 A1* | 9/2005 | Welsh | | B64C 27/001 |
| | | | | 416/170 R |
| 2008/0059012 A1* | 3/2008 | Konopa | | B60G 13/16 |
| | | | | 701/22 |
| 2008/0169384 A1* | 7/2008 | Adams | | G05D 1/107 |
| | | | | 244/76 R |
| 2013/0338856 A1* | 12/2013 | Yelland | | B64C 13/18 |
| | | | | 701/2 |
| 2015/0203184 A1* | 7/2015 | Sarmiento | | B64B 1/68 |
| | | | | 244/30 |
| 2015/0329204 A1* | 11/2015 | Nelson | | B64C 27/26 |
| | | | | 244/6 |
| 2018/0117981 A1* | 5/2018 | Lacaze | | B60F 3/0061 |
| 2019/0276140 A1* | 9/2019 | Poltorak | | B64C 17/02 |
| 2019/0321971 A1* | 10/2019 | Bosworth | | B25J 9/1065 |
| 2020/0047901 A1* | 2/2020 | Cameron, Jr. | | B64C 27/57 |
| 2021/0009260 A1* | 1/2021 | Griffin | | B64C 27/001 |
| 2022/0119096 A1* | 4/2022 | Poltorak | | B64C 27/04 |

OTHER PUBLICATIONS

How Renault F1 won a World championship by creating the tuned mass damper; Feb. 25, 2016; https://mooregoodink.com/how-renault-f1-found-faster-lap-times-and-won-a-world-championship.

Min Kim et al; The Stabilizer Design for a Drone-Mounted Camera Gimbal system Using Intelligent-PID controller and Tuned Mass Damper; 2016 SERSC.

* cited by examiner

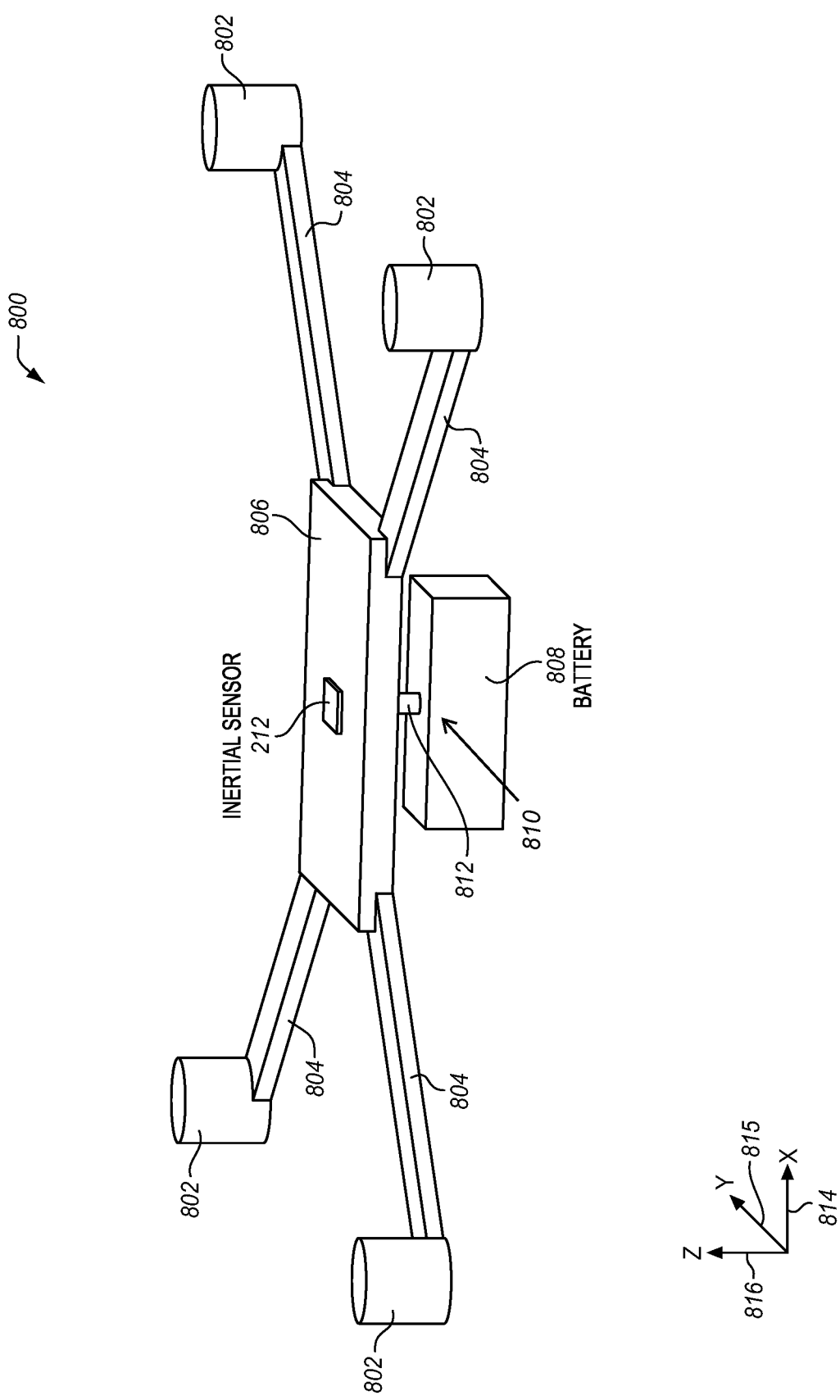

STEP RESPONSE

BODE DIAGRAM
Gm = Inf, Pm = 50.9 deg (at 17.2 rad/s)

STEP RESPONSE

BODE DIAGRAM
Gm = Inf, Pm = 19.9 deg (at 16.4 rad/s)

STEP RESPONSE

BODE DIAGRAM
Gm = Inf, Pm = 50.9 deg (at 16.5 rad/s)

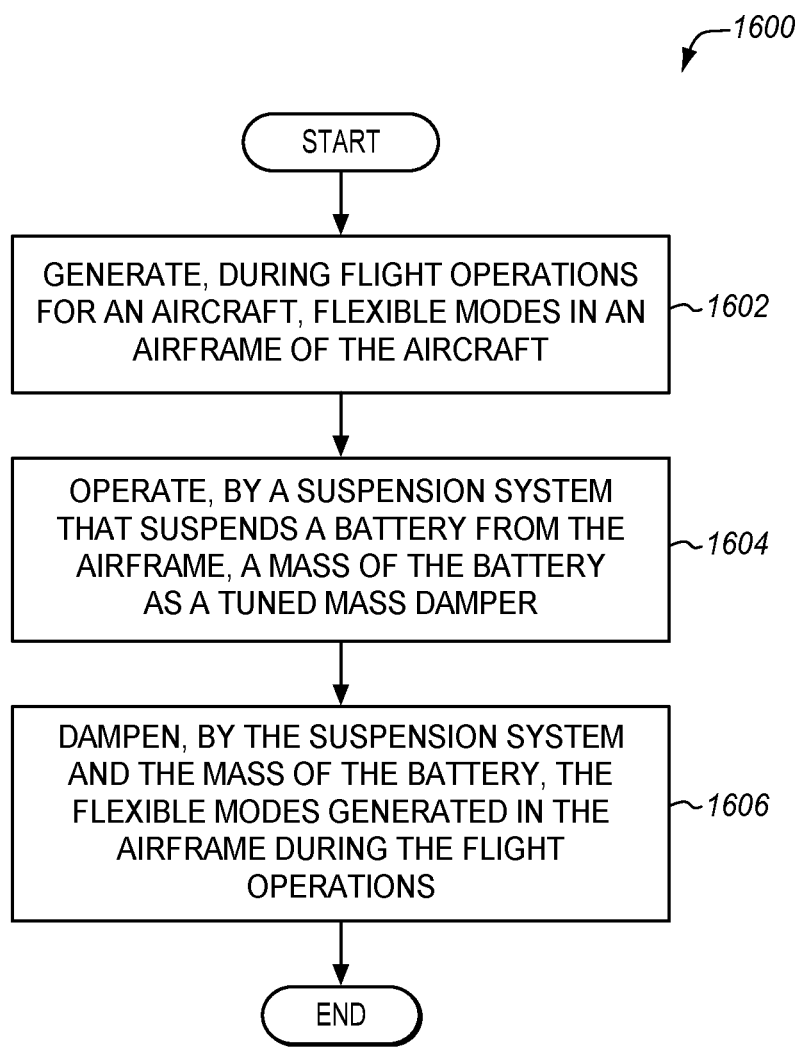

TUNED MASS DAMPER FOR AIRCRAFT

FIELD

This disclosure relates to the field of aircraft, and in particular, to mitigating the effects of flexible modes in the airframe of aircraft.

BACKGROUND

Multirotor aircraft utilizes a plurality of rotors to supply lift to the aircraft. When the airframe of a multi-rotor aircraft is flexible, the thrust of the rotors can impart flexible modes in the airframe that may lead to reduced flight handling qualities of the aircraft. While increasing the rigidity of the multi-rotor aircraft is an option, this may increase the weight of the aircraft, which is undesirable due to the reduction in the available flight time of the aircraft.

Therefore, there is a need to improve the flight performance of multi-rotor aircraft that utilize flexible airframes.

SUMMARY

Embodiments herein describe mitigating flexible modes in an airframe of an aircraft by operating a battery for the aircraft as a tuned mass damper. A suspension system for the aircraft suspends the battery from the airframe, and is specifically tuned to use the mass of the battery to suppress or dampen the flexible modes in the airframe. Dampening the flexible modes in the airframe improves the performance of the aircraft, mitigates vibrations in the aircraft that impact vibration-sensitive components (e.g., cameras, inertial sensors, etc.) and improves the ride quality for the passengers of the aircraft. Further, dampening the flexible modes in the airframe improves the controllability of the aircraft.

One embodiment comprises an Unmanned Aerial Vehicle (UAV). The UAV includes a flexible airframe, a plurality of propulsors coupled to the flexible airframe that generate thrust for the UAV, a battery that provides electrical power for the plurality of propulsors, and a suspension system that suspends the battery from the flexible airframe and operates the mass of the battery as a tuned mass damper to dampen flexible modes generated in the flexible airframe during flight.

Another embodiment comprises an aircraft. The aircraft includes an airframe, a battery that provides electrical power for the aircraft, and a suspension system that suspends the battery from the airframe and operates a mass of the battery as a tuned mass damper to dampen flexible modes generated in the airframe during flight.

Another embodiment comprises a method of operating an aircraft comprising an airframe, a battery, and a suspension system that suspends the battery from the airframe. The method comprises generating, during flight operations of the aircraft, flexible modes in the airframe. The method further comprises operating, by the suspension system, a mass of the battery as a tuned mass damper. The method further comprises dampening, by the suspension system and the mass of the battery, the flexible modes generated in the airframe during the flight operations.

The features, functions, and advantages that have been discussed can be achieved independently in various embodiments or may be combined in yet other embodiments, further details of which can be seen with reference to the following description and drawings.

DESCRIPTION OF THE DRAWINGS

Some embodiments are now described, by way of example only, and with reference to the accompanying drawings. The same reference number represents the same element or the same type of element on all drawings.

FIG. 8 depicts a model of a multirotor aircraft in an illustrative embodiment.

FIG. 16 is a flow chart of a method of operating an aircraft in an illustrative embodiment.

DETAILED DESCRIPTION

The figures and the following description illustrate specific exemplary embodiments. It will be appreciated that those skilled in the art will be able to devise various arrangements that, although not explicitly described or shown herein, embody the principles described herein and are included within the contemplated scope of the claims that follow this description. Furthermore, any examples described herein are intended to aid in understanding the principles of the disclosure are to be construed as being without limitation. As a result, this disclosure is not limited to the specific embodiments or examples described below, but by the claims and their equivalents.

Modern flight controllers for multirotor aircraft sense motion up to relatively high frequencies in order to maintain ride quality through hovering and transitional flight. Light and stiff airframes that are designed to meet performance requirements typically have lightly damped flexible modes. Some of these flexible modes may move into the operating frequency range of the flight controller and may be misinterpreted by the flight controller as motion of the aircraft. Typical solutions to this problem utilize notch filters for the flexible modes in the airframe of the aircraft, but this approach can degrade the performance of the flight controller at the notch frequencies. Further, the use of notch filters may generate limitations on bandwidth due to the added phase associated with the notch filters.

The ability to reduce flexible modes in the airframes of aircraft can enhance the payload and handling capabilities of the aircraft through reduction in the vibrational environment that the payload is subject to. Vibration sensitive payloads such as optical cameras, inertial equipment, and delicate environmental sensors can also benefit from reduced airframe vibration. Weight that may be carried for isolators and sophisticated damping gimbals could be reduced or eliminated when the airframe vibration is reduced.

Figure 1:
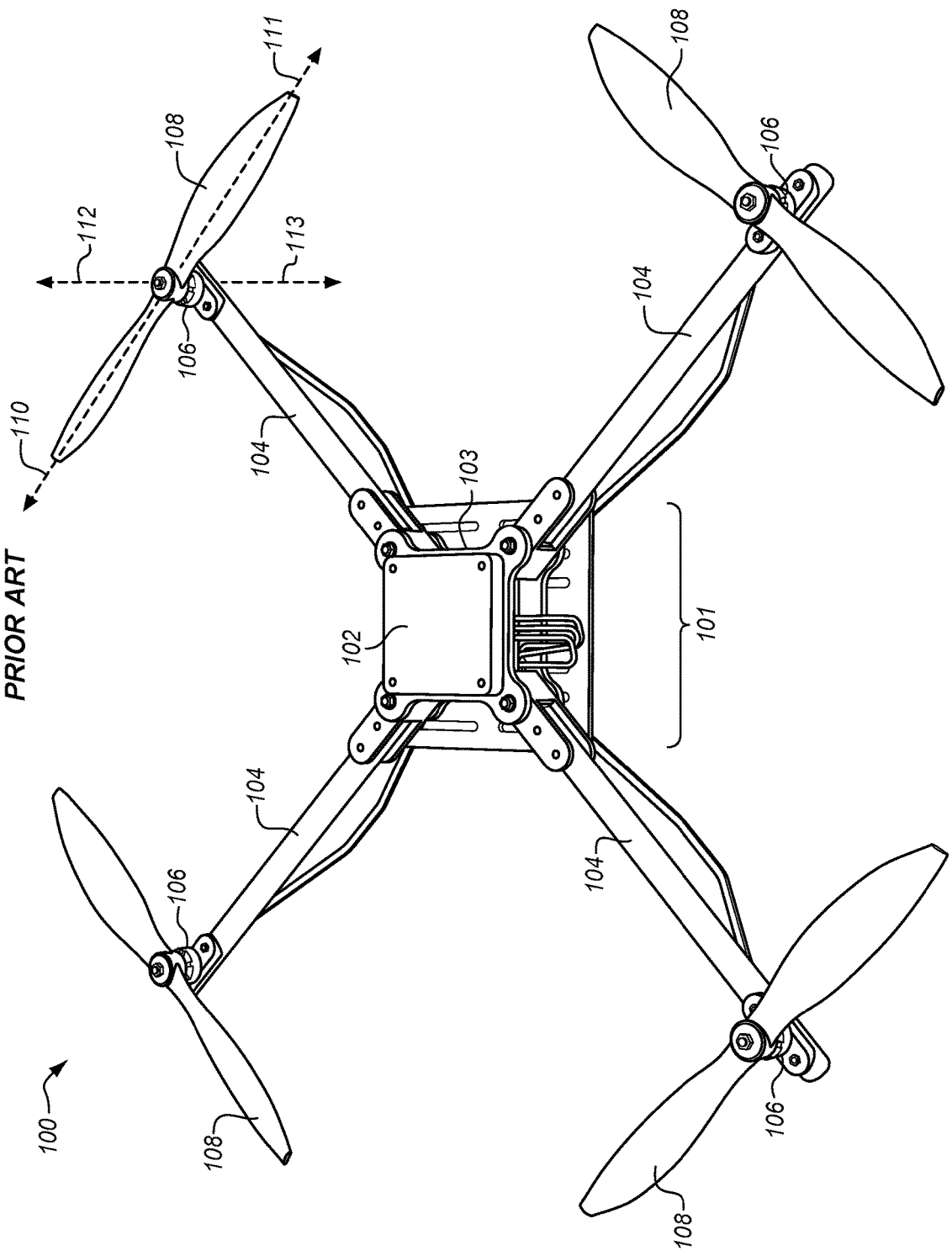
FIG. 1 illustrates a perspective view of an Unmanned Aerial Vehicle (UAV) in the prior art.

FIG. 1 illustrates a perspective view of a UAV 100 in the prior art. In FIG. 1, UAV 100 includes a center member 101 and arms 104 that extend from center member 101. Center member 101 includes flight electronics 102 and batteries 103. Motors 106 are coupled to a distal portion of arm 104. During flight operations for UAV 100, motors 106 operate to supply lift to UAV 100 utilizing rotors 108.

During flight operations, motors 106 generate a variable thrust and/or a variable torque to provide stability to UAV 100. However, the variable thrust and/or the variable torque may generate variable loads upon UAV 100, which may cause flexible modes to be generated within UAV 100 if UAV 100 has a flexible airframe. For example, variable torques generated by motors 106 and rotors 108 during flight can cause a deflection of arms 104 in the directions of arrows 110-111. This deflection is in the same plane as rotors 108. Variable thrusts generated by motors 106 and rotors 108 during flight can cause a deflection of arms 104 in the directions of arrows 112-113. This deflection is perpendicular to the plane of rotors 108. These flexible modes may cause instability during flight operations and/or generate undesirable vibrations that impact payloads, electro-mechanical systems, cameras, etc., that may be present on UAV 100.

Typically, UAVs include centralized control electronics, sensors, and batteries as illustrated for UAV 100. Lightly damped flexible modes may cause higher vibration and increased stress on the airframe of UAV 100. While providing a stiffer airframe for UAV 100 is an option, doing so adds weight to UAV 100, which may reduce the operational flight time and/or the performance of UAV 100.

Figure 2:
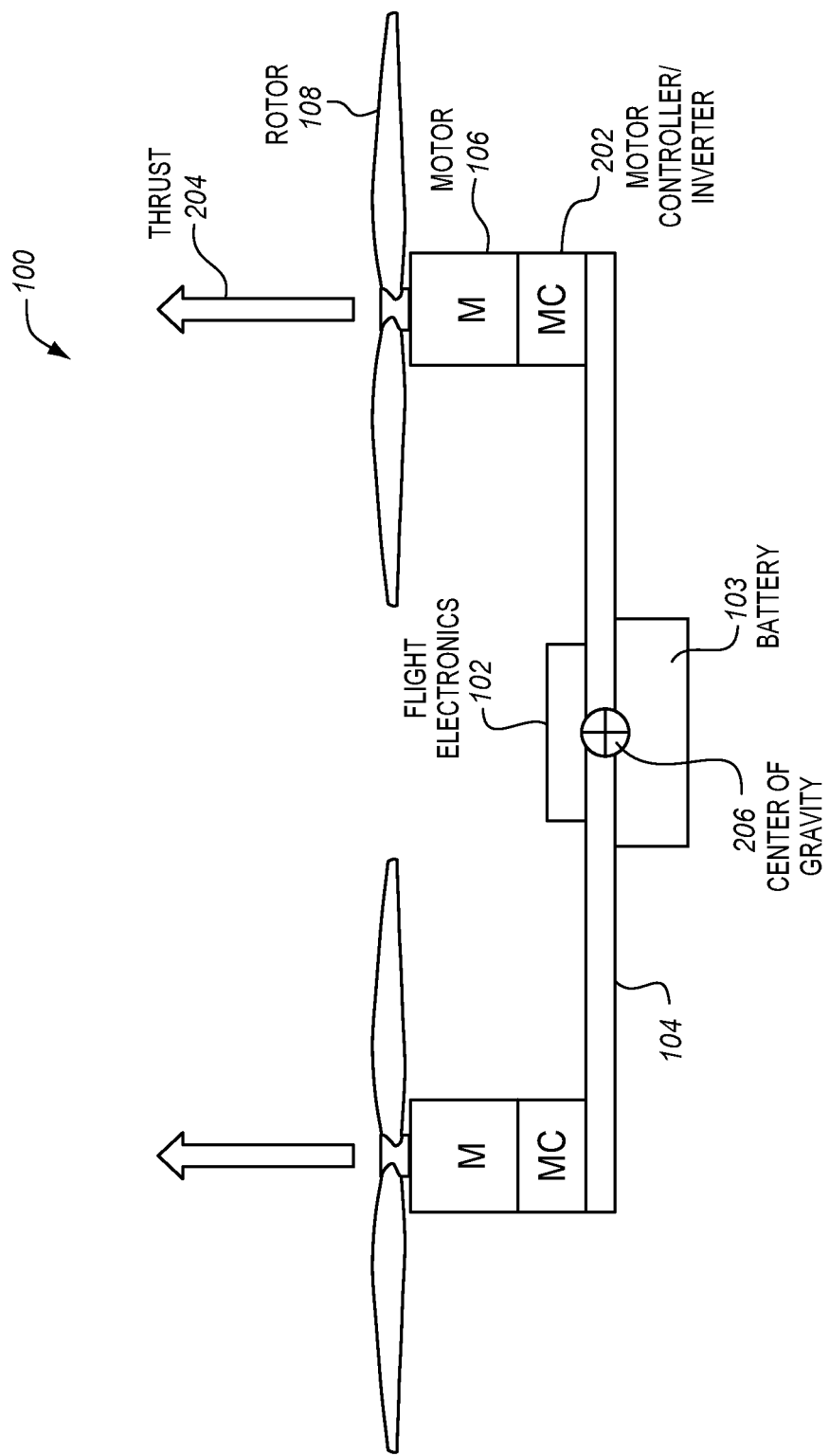
FIGS. 2-4 illustrates a side view of the UAV of FIG. 1 in the prior art.
Figure 3:
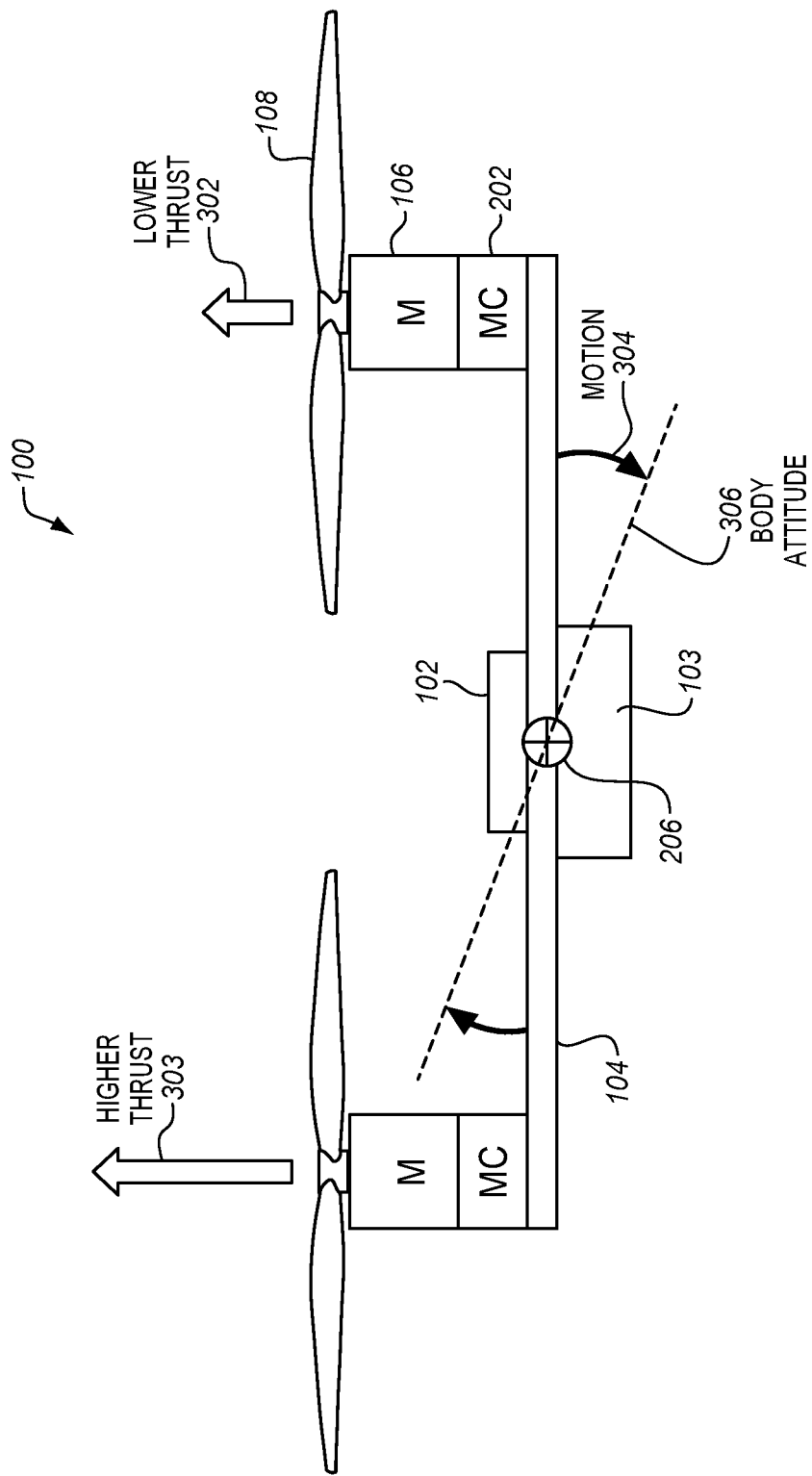
Figure 4:
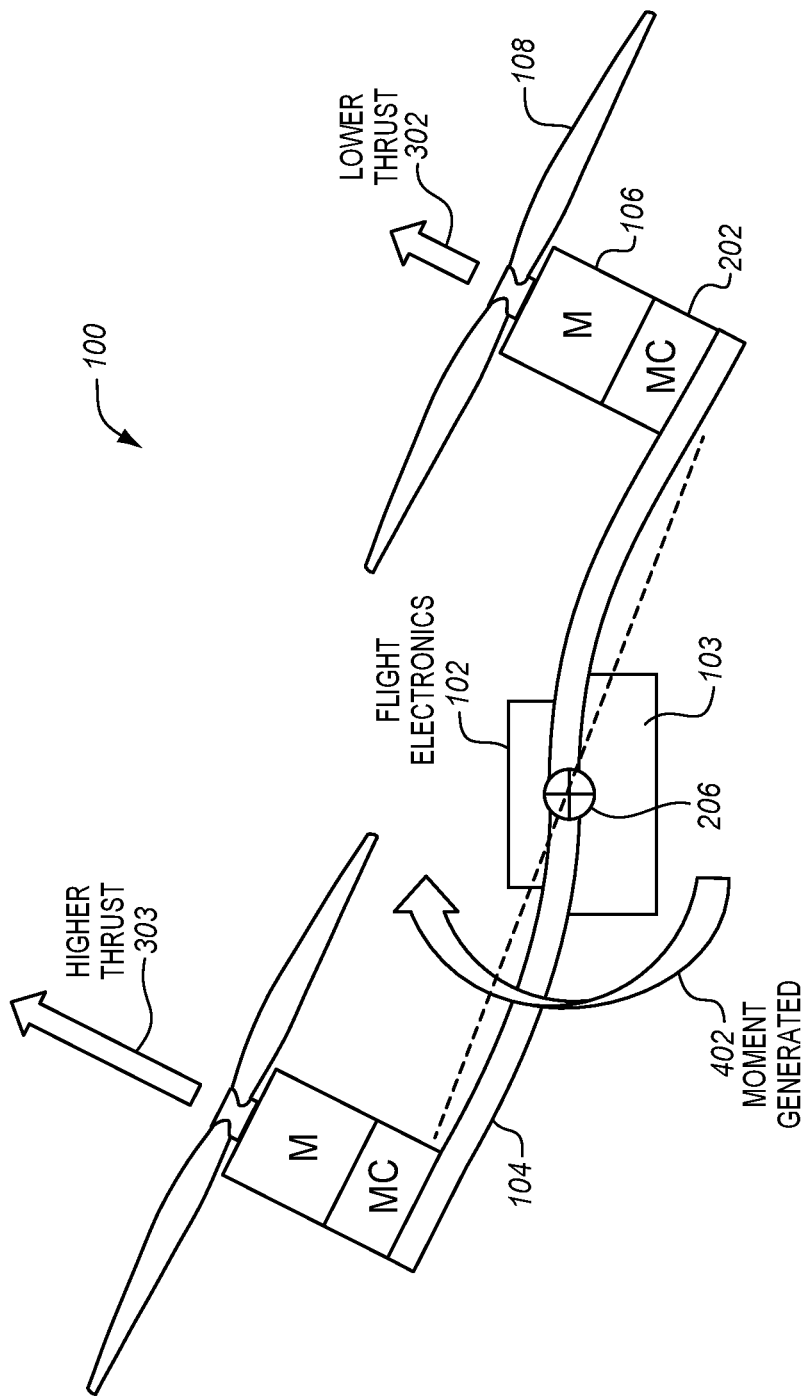

FIGS. 2-4 illustrates a side view of UAV 100 in the prior art. In FIG. 2, motor controllers 202 are located proximate to motors 106, which spin rotors 108 to supply thrust 204 to UAV 100. Flight electronics 102 and battery 103 are located at center of gravity 206.

FIGS. 3-4 illustrates how differential thrust 302-303 generates motion 304 to place UAV 100 into a non-horizontal body attitude 306. In FIG. 4, a moment 402 is generated by differential thrust 302-303, which causes flexing of the airframe of UAV 100 (e.g., flexing in arms 104 and other airframe structures of UAV 100). This flexing generates a flexible mode in the airframe. The result of the flexible mode is reduced handling qualities, higher structural loads, and higher vibration in UAV 100.

In the embodiments described herein, a tuned mass damper is implemented for aircraft using a mass of a battery for the aircraft. The mass of the battery on an aircraft can operate as a tuned mass damper using a specifically designed and tuned suspension system that mechanically couples the battery to the airframe of the aircraft. The suspension system is a flexible element (or a combination of elements, some of which are flexible and some of which may be inflexible) that is designed to be compliant in one or more specific degrees of freedom. The use of the mass of the battery as a tuned mass damper results in an overall reduction in vibrations in the aircraft generated by the flexible modes of the aircraft's airframe.

Figure 5:
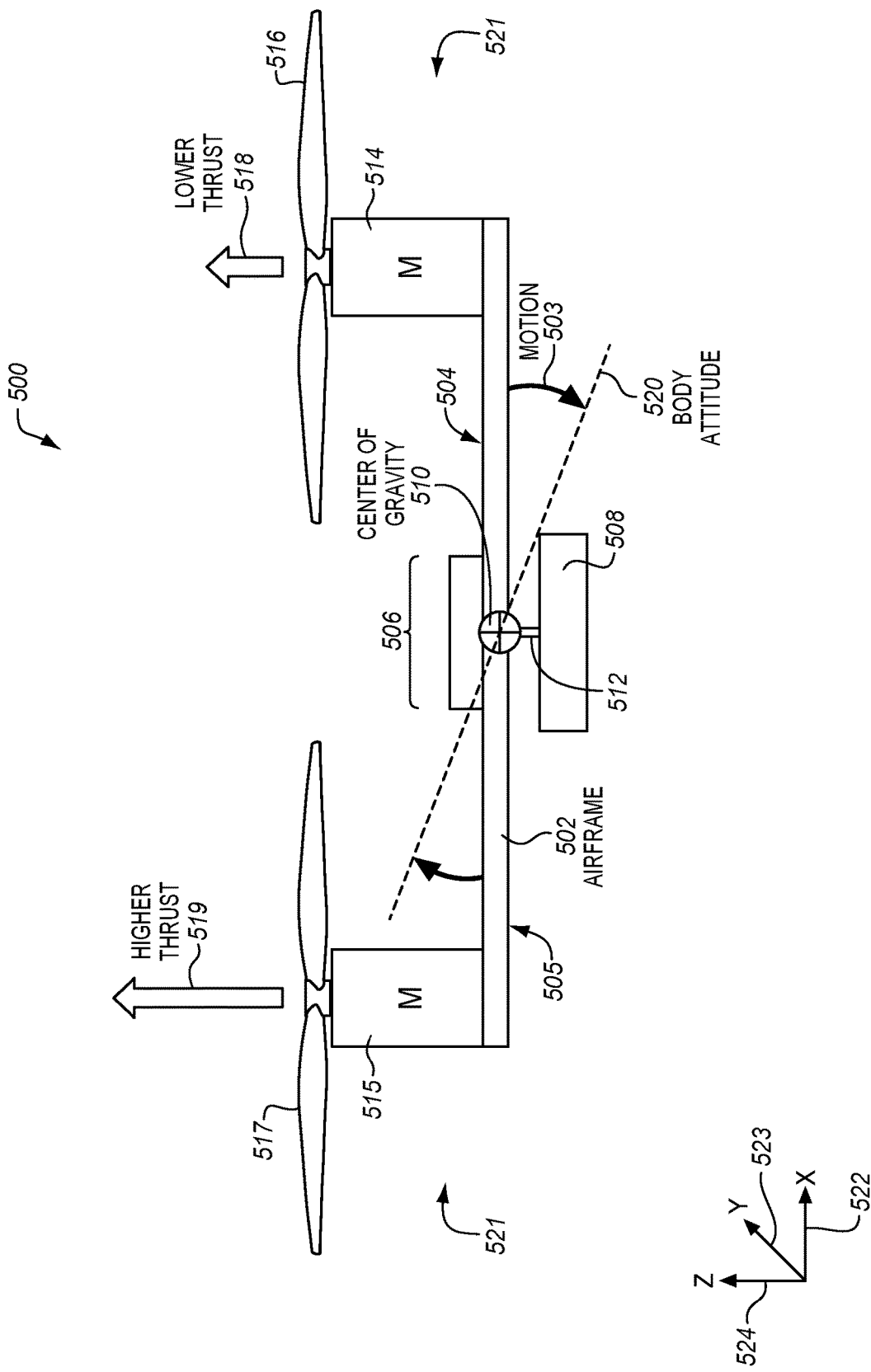
FIGS. 5-6 illustrates a side view of an aircraft in an illustrative embodiment.

FIG. 5 illustrates a side view of an aircraft 500 in an illustrative embodiment. While FIG. 5 illustrates aircraft 500 as having a particular design, structural orientation, and location of various elements, aircraft 500 is not limited to this particular representation. In particular, aircraft 500 includes any multi-rotor vehicle that includes a flexible airframe 502. In some embodiments, aircraft 500 comprises a UAV.

Aircraft 500 in this embodiment includes arms 504-505 that extend from a central body 506 of airframe 502. A battery 508 is coupled to airframe 502 using a suspension system 512. Battery 508 comprises any component, system, or device that stores electrical energy. In this embodiment, suspension system 512 comprises any component, system, or device that utilizes the mass of battery 508 as a tuned mass damper in order to reduce the flexible modes in airframe 502 of aircraft 500. Therefore, suspension system 512 has a specific structure, coating, and/or composition that is designed to be compliant in one or more specific degrees of freedom. In one embodiment, suspension system 512 is designed to be compliant for rotation about a y-axis 523 (e.g., pitch for aircraft 500). In other embodiments, suspension system 512 is designed to be compliant in one or more of six degrees of freedom for aircraft 500 for translating in three-dimensional space. Specifically, the six degrees of freedom for aircraft 500 include changes in position on x-axis 522, y-axis 523, and z-axis 524, as well as changes in orientation between axis 522-524 through rotation, which is typically referred to as pitch, yaw, and roll.

In some embodiments, suspension system 512 comprises one or more composite structures (e.g., composite beams). In some embodiments, the composite beams include a constrained layer damping treatment applied to their surfaces. In other embodiments, suspension system 512 comprises foam, springs, elastomers, flexures, or combinations of foams, springs, elastomers, and flexures that are tuned to operate the mass of battery 508 as a tuned mass damper to suppress, mitigate, or dampen the flexible modes in airframe 502.

In this embodiment, battery 508 is coupled to and/or suspended from airframe 502 of aircraft 500 via suspension system 512 proximate to center of gravity 510. In other embodiments, battery 508 is coupled to airframe 502 of aircraft 500 using suspension system 512 at locations different than center of gravity 510. In this embodiment, electric motors 514-515 are coupled to their corresponding rotors 516-517 at distal ends of arms 504-505, respectively. Electric motors 514-515 and their corresponding rotors 516-517 supply thrust 518-519 to aircraft 500. Electric motors 514-515 and their corresponding rotors 516-517 are referred to as propulsors 521 in some embodiments. Propulsors 521 comprise any component, system, or device that generates thrust (e.g., one or more combinations of motors, rotors, jet engines, ducted fans, engines, etc.).

Figure 6:
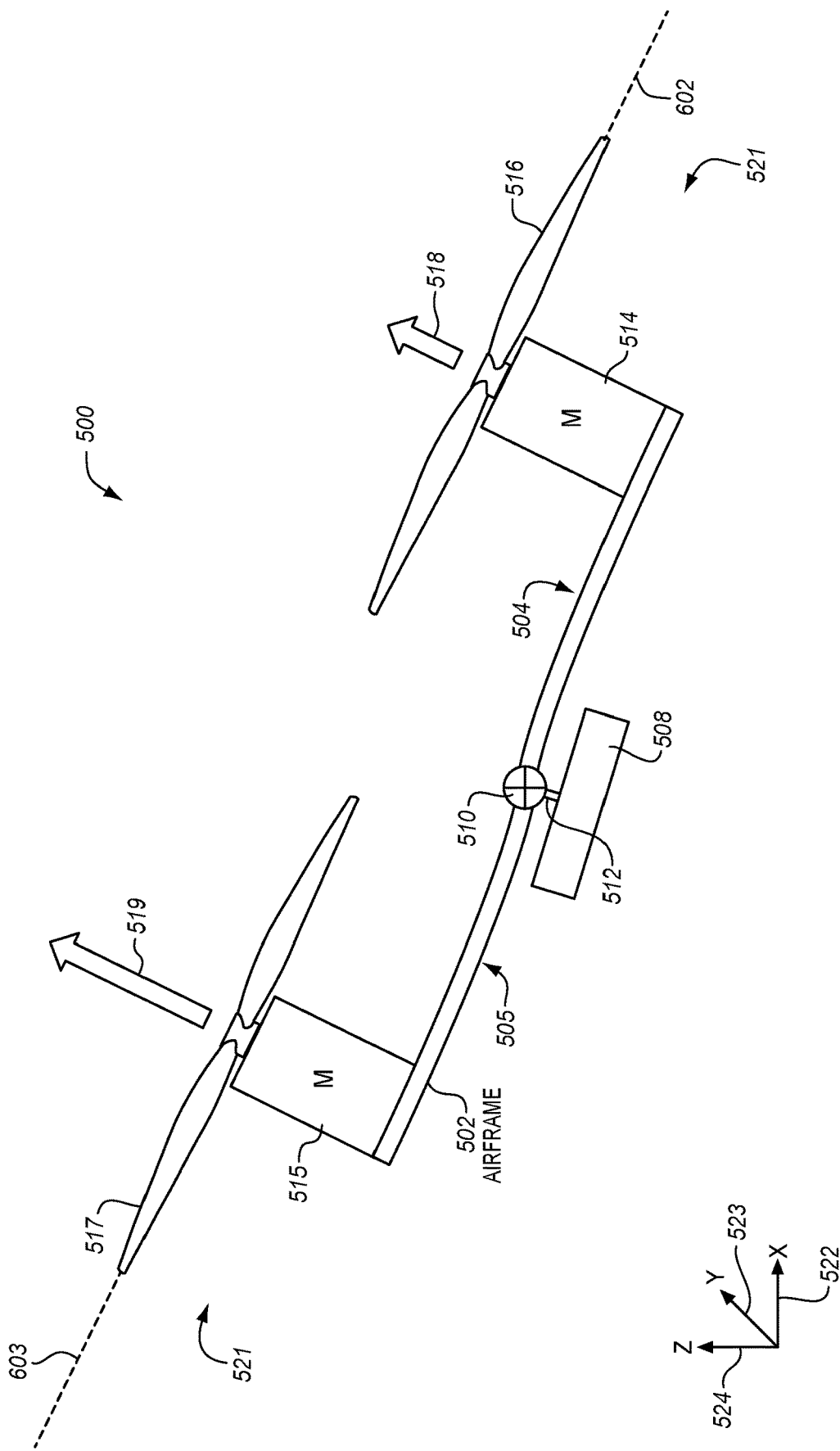

In the example illustrated in FIG. 5, thrust 518 generated by electric motor 514 and rotor 516 is lower than thrust 519 generated by electric motor 515 and rotor 517. The result of the difference in thrust 518-519 is a rotation of aircraft 500 about center of gravity 510, resulting in motion 503. Due to motion 503, aircraft 500 rotates into a body attitude 520. FIG. 6 illustrates a side view of aircraft 500 after rotation in an illustrative embodiment. During rotation, the flexible mode generated in airframe 502 is damped by the operation of suspension system 512 coupling with the mass of battery 508, which operates as a tuned mass damper at the flexible modes generated in airframe 502.

In this example, the flexible mode generated in arm 504 of aircraft 500 is a motion that is perpendicular to a plane 602 formed by rotor 516, while the flexible mode generated in arm 505 of aircraft 500 is a motion that is perpendicular to a plane 603 formed by rotor 517. Suspension system 512 is specifically designed, using the mass of battery 508, to mechanically dampen the motion perpendicular to plane 602 formed by rotor 516 and perpendicular to plane 603 formed by rotor 517 (among other flexible modes in airframe 502).

Figure 7A:
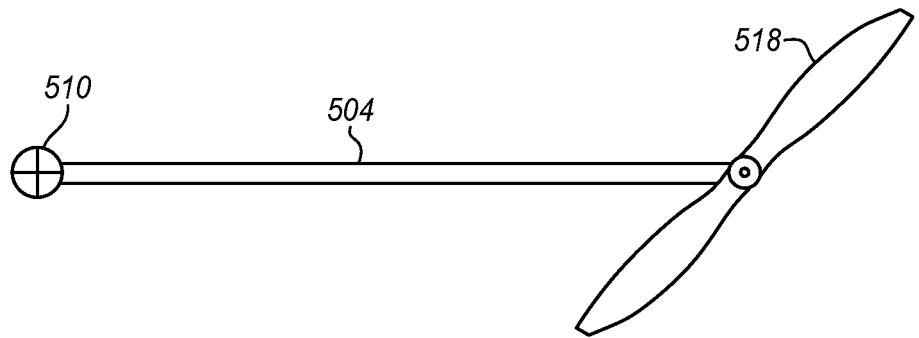
FIGS. 7A-7C illustrate top views of an arm of the aircraft of FIG. 5 in an illustrative embodiment.
Figure 7B:
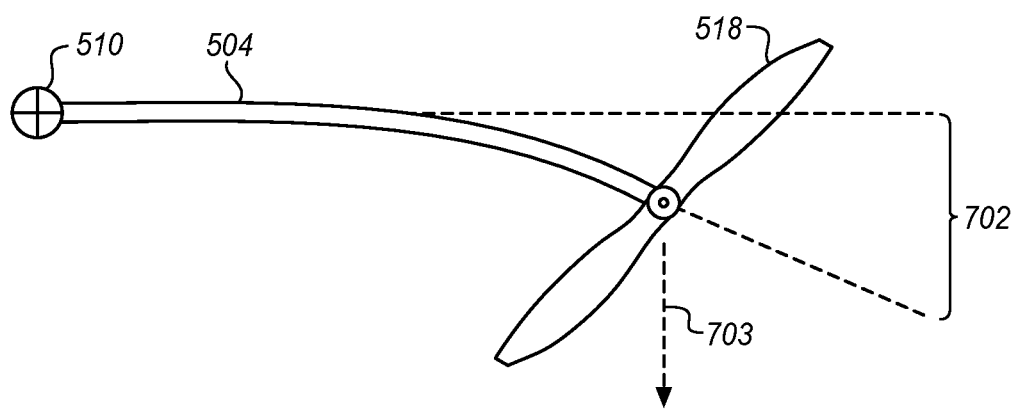
Figure 7C:
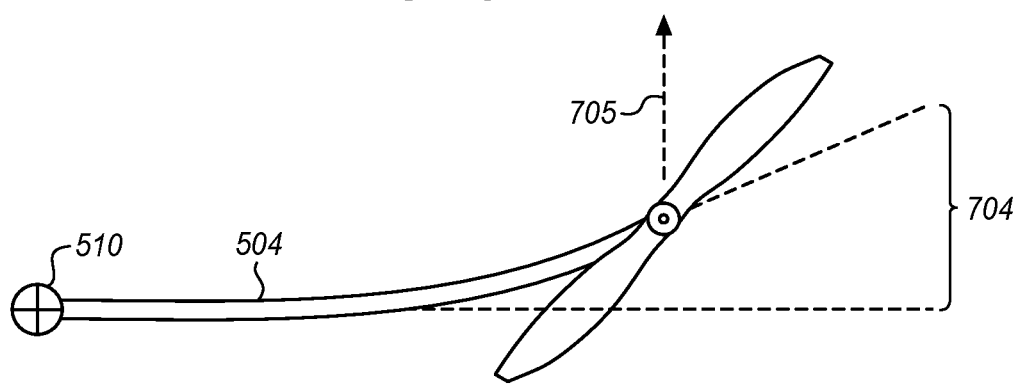

In addition to the flexible mode generated by thrust 520-521, a flexible mode is also generated based on the torque generated by electric motors 514-515. This torque introduces a flexible mode in arms 504-505 that is in planes 602-603 of rotors 516-517. FIGS. 7A-7C illustrate top views of arm 504 of aircraft 500 in an illustrative embodiment. In particular FIG. 7A illustrates no flexible mode activity in plane 602 (the surface of the page in FIG. 7A). FIG. 7B illustrates a deflection 702 of arm 504 relative to FIG. 7A in the direction of arrow 703, and FIG. 7C illustrates a deflection 704 of arm 504 in the direction of arrow 705.

In this example, the flexible mode generated in arm 504 of aircraft 500 is a motion that is in plane 602 of rotor 516. Suspension system 512 is specifically designed, using the mass of battery 508, to mechanically dampen the motion in plane 602 of rotor 516 and in plane 603 of rotor 517 (among other flexible modes in airframe 502).

FIG. 8 illustrates a model 800 of a multirotor aircraft in an illustrative embodiment. In this embodiment, model 800 includes four motors 802 attached by arms 804 to a center portion 806. A battery 808 in model 800 is attached to center portion 806 by a suspension system 810. Model 800 further includes an inertial sensor 212 centrally located at center portion 806. In model 800, suspension system 810 is tuned to operate the mass of battery 808 as a tuned mass damper to mechanically dampen flexible modes in model 800.

In the analysis of the functional modes present in model 800, the analysis will be limited to rotation about y-axis 815 for simplicity. Further, the control system design for dampening the rotational functional modes in y-axis 815 will be limited to y-axis 815 for simplicity. However, the results for rotation about y-axis 815 and its associated control system design may be generalized to include all six degrees of freedom for model 800 when translating in three-dimensional space. Specifically, the six degrees of freedom for model 800 include changes in position on x-axis 814, y-axis 815, and z-axis 816, as well as changes in orientation between axis 814-816 through rotation, which is typically referred to as pitch, yaw, and roll.

Figure 9:
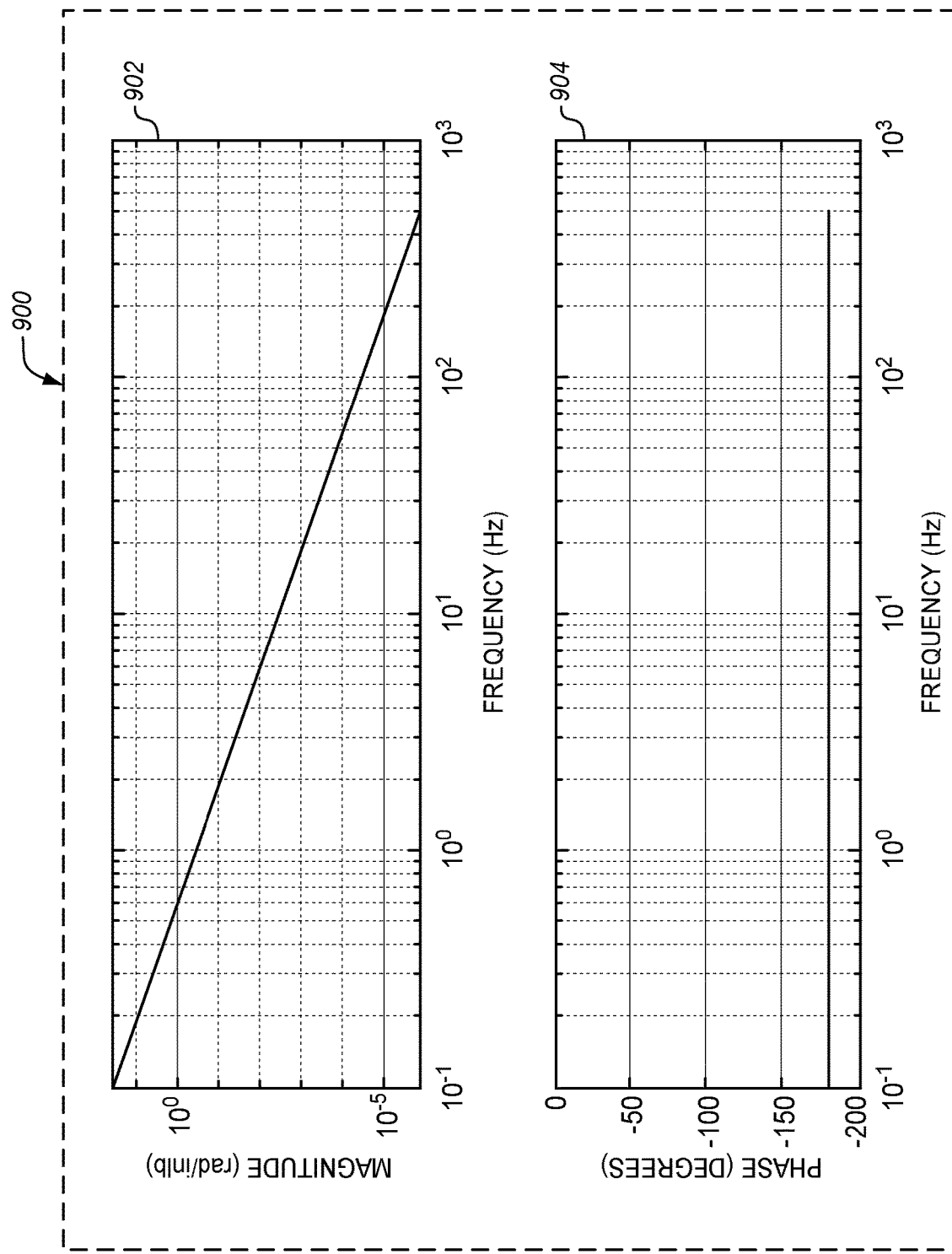
FIG. 9 depicts a transfer function in the y-axis for the model of FIG. 8 when the model is rigid in an illustrative embodiment.

FIG. 9 illustrates a transfer function 900 in y-axis 815 for model 800 when model 800 is rigid in an illustrative embodiment. When model 800 is rigid, functional modes are not generated due to positional changes on y-axis 815 or pitch changes.

Generally, a transfer function is a mathematical function which theoretically models an output for a system for each possible input to the system. In the simplest form, a transfer function is a two-dimensional graph of an independent input verses a dependent output. The dimensions and units of the transfer function model the output response of a device for a range of possible inputs.

With respect to transfer function 900, FIG. 9 depicts a transfer function of the angular displacement about y-axis 815 in response to a torque in y-axis 815 applied by motors 802 of model 800 in an illustrative embodiment. Transfer function 900 assumes that model 800 is rigid or that the dynamics of model 800 are sufficiently high in frequency as to not be evident in pitch transfer function 300. Plot 902 of transfer function 900 represents the magnitude of the response to torque with respect to frequency, and plot 904 of transfer function 900 represents the phase of the response to torque with respect to frequency. For example, when applying a simulated torque to model 800 at 0.1 hertz, the response would be an amplitude of around three radians per inch pound (see plot 902). Also, the response would be 180 degrees out of phase with the torque.

Figure 10:
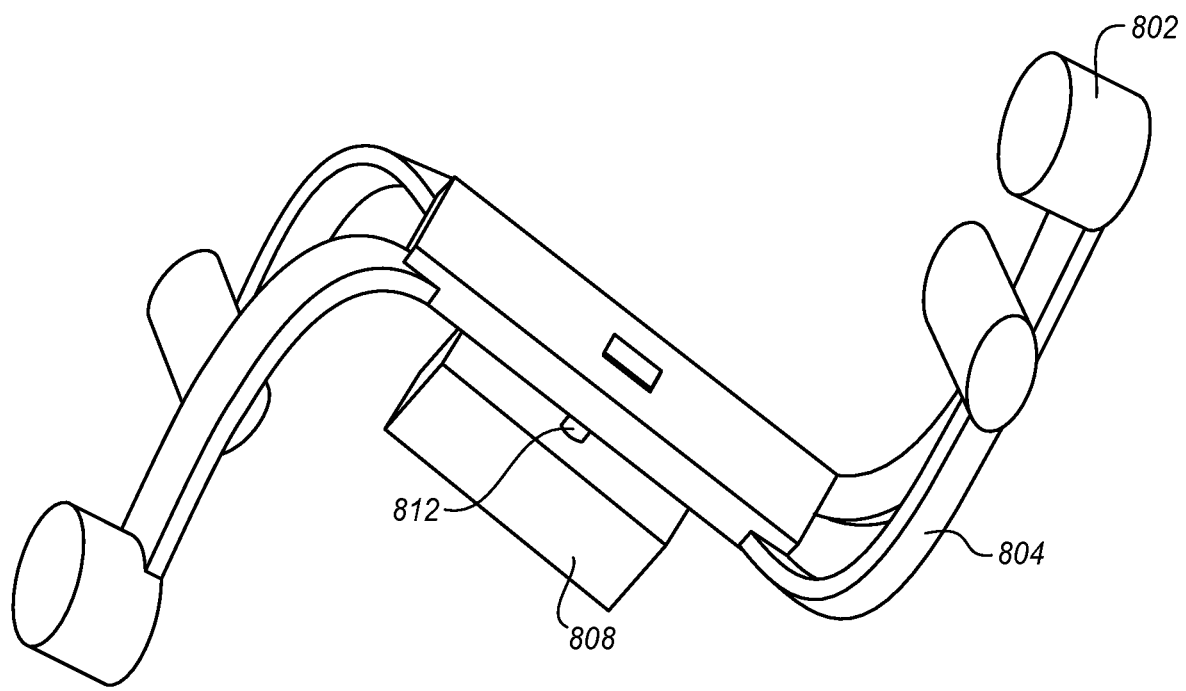
FIG. 10 depicts a flexible mode of the model of FIG. 8 in an illustrative embodiment.
Figure 11:
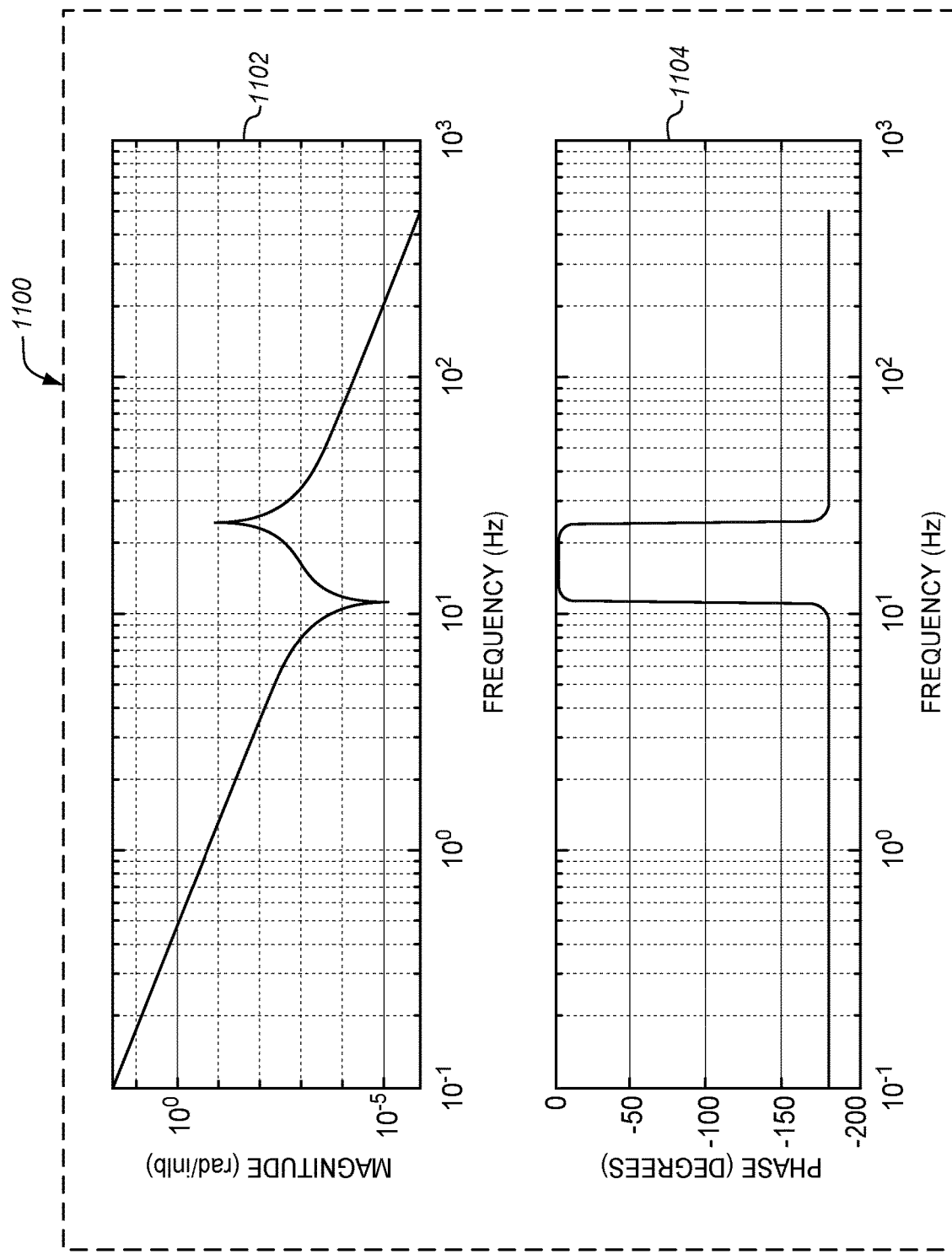
FIG. 11 depicts a transfer function for a first flexible mode of the model of FIG. 8 in an illustrative embodiment.

A flexible mode of model 800 that participates in a pitch transfer function, if arms 804 are flexible but flexure 812 is stiff (a first flexible mode), is illustrated in FIG. 10. When this flexibility is included in the calculation of a transfer function in y-axis 815, the results are illustrated in FIG. 11. FIG. 11 depicts a transfer function 1100 for a first flexible mode of model 800 in an illustrative embodiment. Plot 1102 illustrates gain deviations between ten hertz and twenty hertz, and plot 1104 illustrates phase deviations between ten hertz and twenty hertz. These deviations represent flexible modes in model 800 if arms 804 are flexible but flexure 812 is stiff. If a flight controller operated in these frequency ranges to control the flight of an aircraft corresponding to model 800, then the deviations in gain and phase illustrated in transfer function 1100 may generate instabilities in the flight control system. While a notch filter may be applied to the bandwidth of the flight controller around these frequencies to mitigate the gain deviations, the use of the notch filter may reduce the performance of the control system, and may further modify the phase response such that the phase margin of the control system is reduced, which may lead to instability in the control system.

Figure 12A:
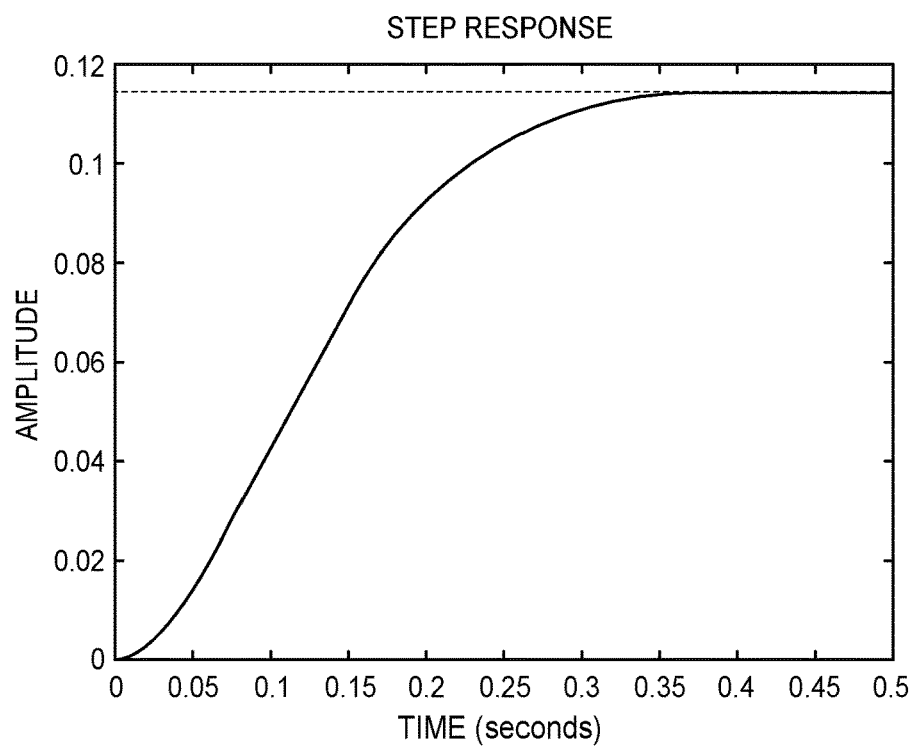
FIG. 12A depicts a step response generated by applying a lead-lag compensator to the transfer function of FIG. 9 in an illustrative embodiment.

A lead-lag compensator may be applied to both model 800 when rigid (e.g., represented by transfer function 900) and model 800 in the first flexible mode (e.g. represented by transfer function 1100). FIG. 12A depicts a step response generated by applying a lead-lag compensator to transfer function 900 (e.g., when model 800 is rigid) in an illustrative embodiment. A step response of a system in a given initial state consists of the time evolution of its outputs when its inputs are step functions. Generally, a step response is the time behavior of the outputs of a system when its inputs change from zero to one in a very short time. From a practical standpoint, knowing how a system responds to a sudden input may be useful because large and possibly fast deviations from a systems steady state behavior may have undesirable effects on the system itself. Further, knowing the step response of a system provides information regarding its stability and its ability to reach a final stationary state when starting in another. The performance of a system may be specified in various time-dependent behaviors in the step response, such as overshoot, rise time, settling time, and ringing. For example, ringing is an oscillation around an output value, and is indicative of the dampening present in the system. For instance, a highly damped system may have little or no ringing, while a lightly damped system has a higher magnitude of ringing that decays more slowly.

Figure 12B:
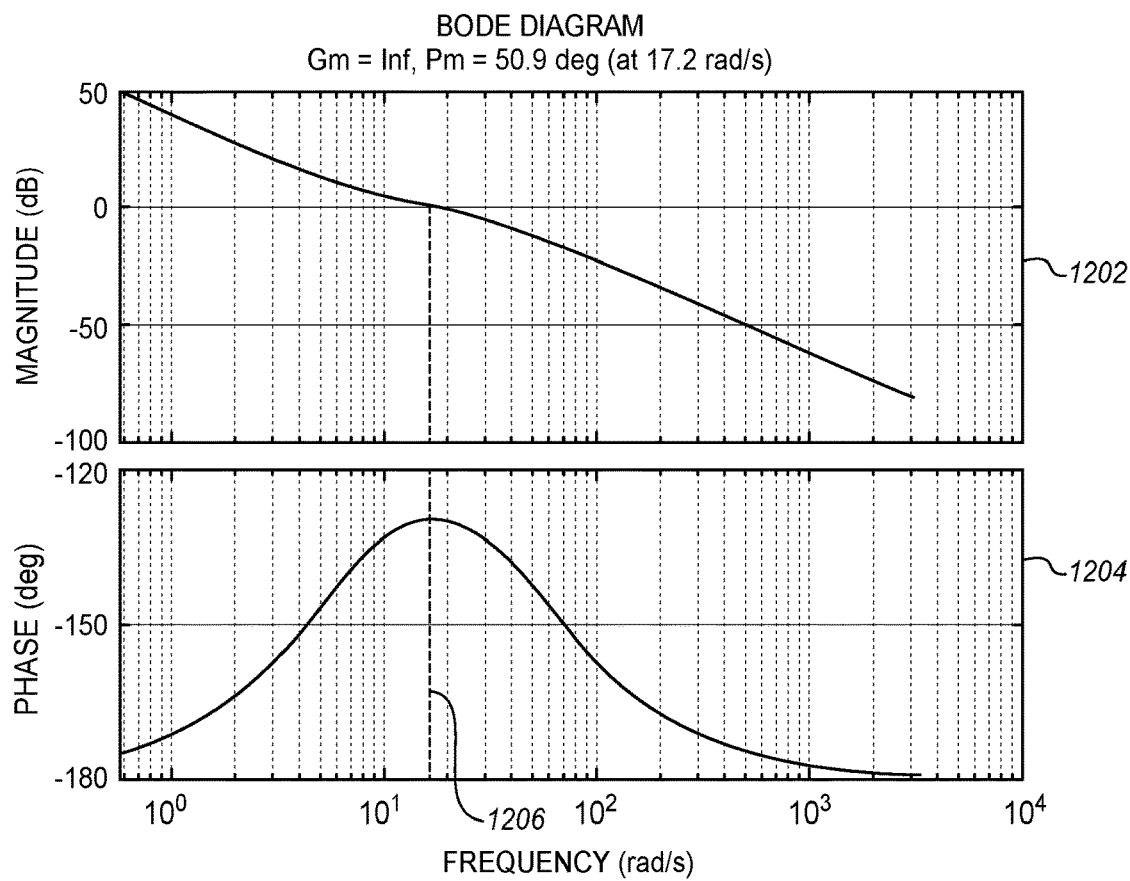
FIG. 12B depicts an open-loop transfer function generated by applying the lead-lag compensator to the transfer function of FIG. 9 in an illustrative embodiment.

FIG. 12B depicts the open-loop transfer function (e.g., a bode diagram) generated by applying the lead-lag compensator to transfer function 900 (e.g., when model 800 is rigid) in an illustrative embodiment. In particular, plot 1202 illustrates the magnitude of the frequency response, and plot 1204 illustrates the phase shift. Information in the open-loop transfer function illustrated in FIG. 12B is useful to determining the stability of model 800 when rigid. Gain margin is one measure of the stability of a system. Gain margin is calculated by identifying the frequency where the phase reaches −180 degrees. In FIG. 12B, the gain margin is infinite. Phase margin is another measure of the stability of a system. Phase margin locates the frequency where the magnitude of the frequency response reaches unity, which is 0 dB in plot 1202, indicated by line 1206. In FIG. 12B, the phase margin is 50.9 degrees. Generally, a system having higher gain and phase margins is more stable than a system that has lower gain and phase margins.

Figure 13A:
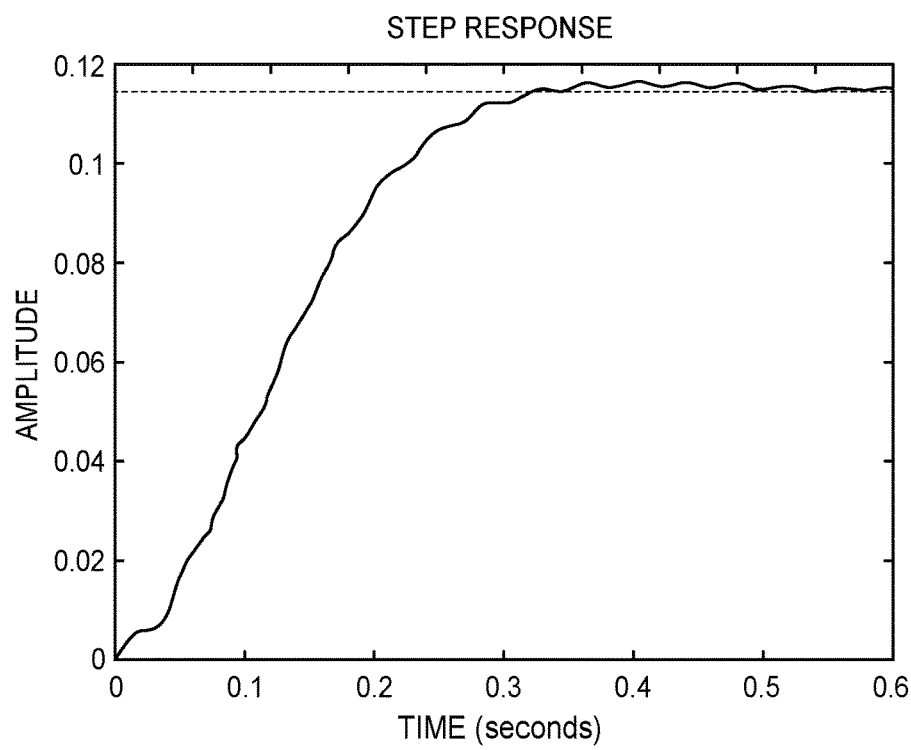
FIG. 13A depicts a step response generated by applying a lead-lag compensator to the transfer function of FIG. 11 in an illustrative embodiment.
Figure 13B:
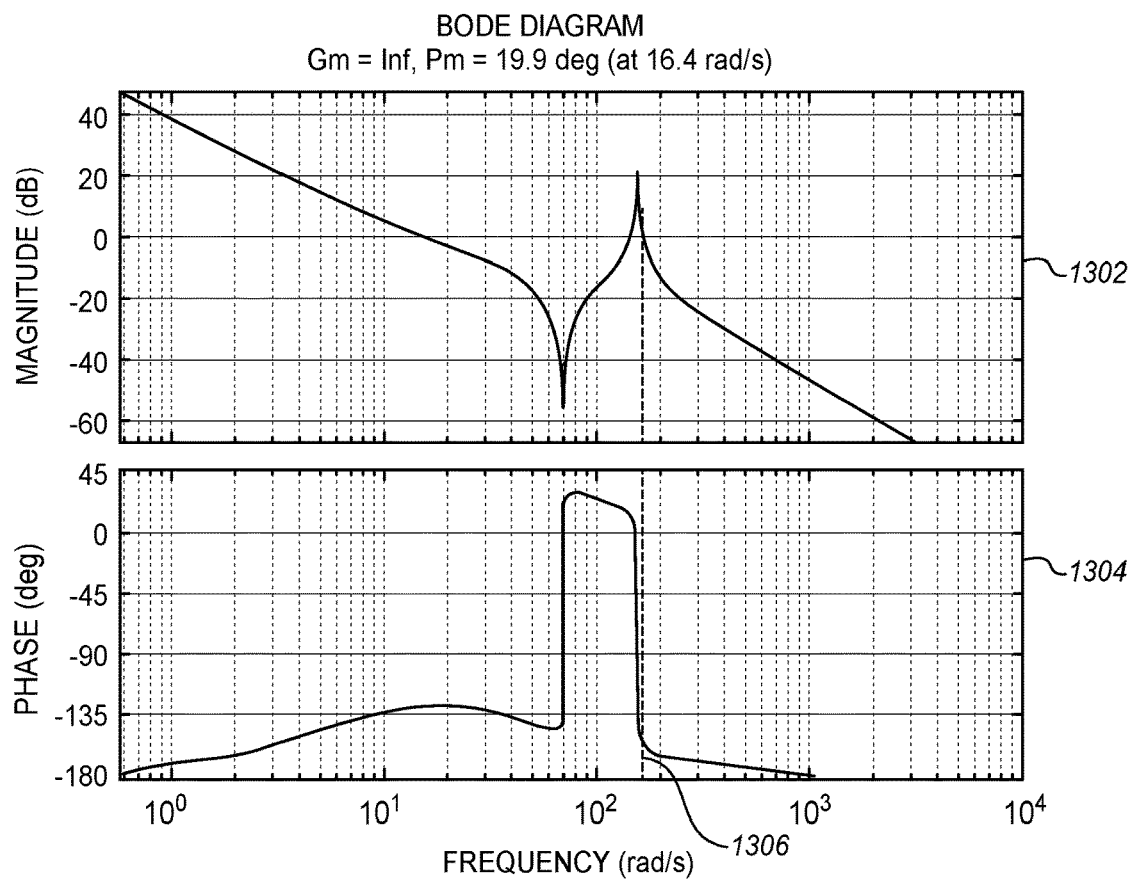
FIG. 13B depicts an open-loop transfer function generated by applying the lead-lag compensator to the transfer function of FIG. 11 in an illustrative embodiment.

FIG. 13A depicts a step response generated by applying the lead-lag compensator to transfer function 1100 (e.g., when model 800 operates in the first flexible mode) in an illustrative embodiment. In particular, plot 1302 illustrates the magnitude of the frequency response, and plot 1304 illustrates the phase shift. In the step response illustrated in FIG. 13A, some ringing in the response is evident, which is due to the first flexible mode in model 800. FIG. 13B depicts an open-loop transfer function generated by applying the lead-lag compensator to transfer function 1100 (e.g., when model 800 operates in the first flexible mode) in an illustrative embodiment. The gain margin illustrated in FIG. 13B remains infinite as was the case for FIG. 12B, however the phase margin has decreased from 50.9 degrees to 19.9 degrees (e.g., at line 1306). The result is that the application of a lead-lag compensator to mitigate the first flexible mode significantly decreases the phase margin of the control system, which may lead to control system instabilities.

Figure 14:
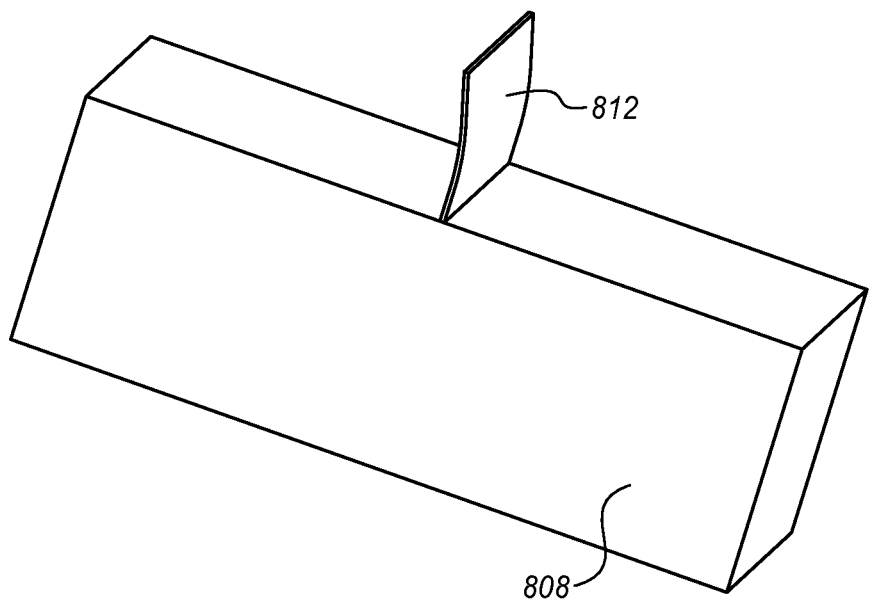
FIG. 14 depicts an uncoupled response for a flexure of the drone model of FIG. 8 in an illustrative embodiment.
Figure 15A:
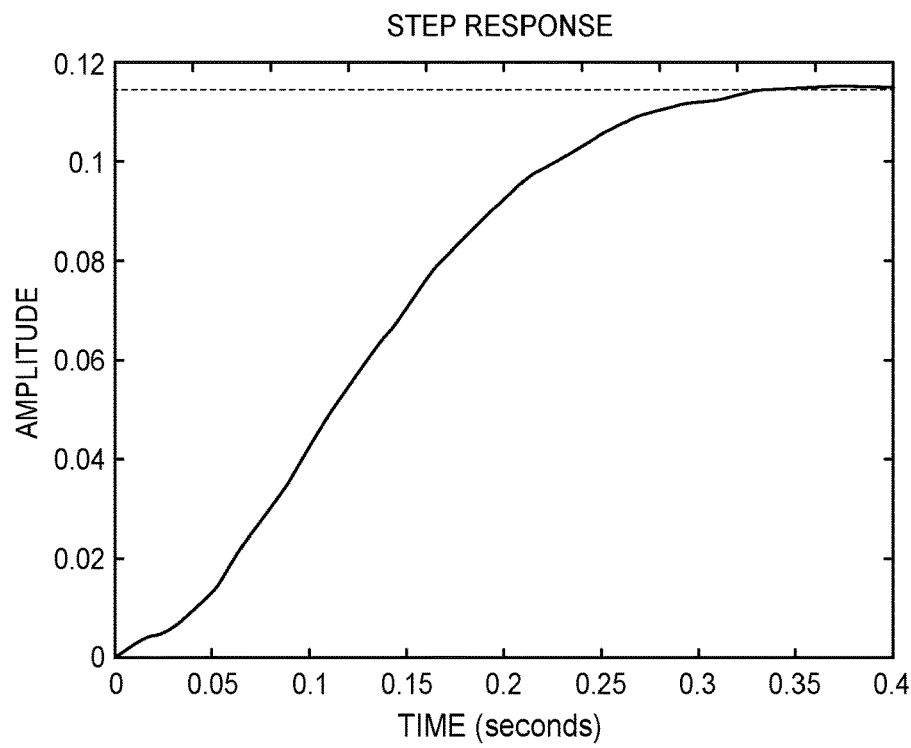
FIG. 15A depicts a step response generated using the suspension system of FIG. 14 for the model in an illustrative embodiment.
Figure 15B:
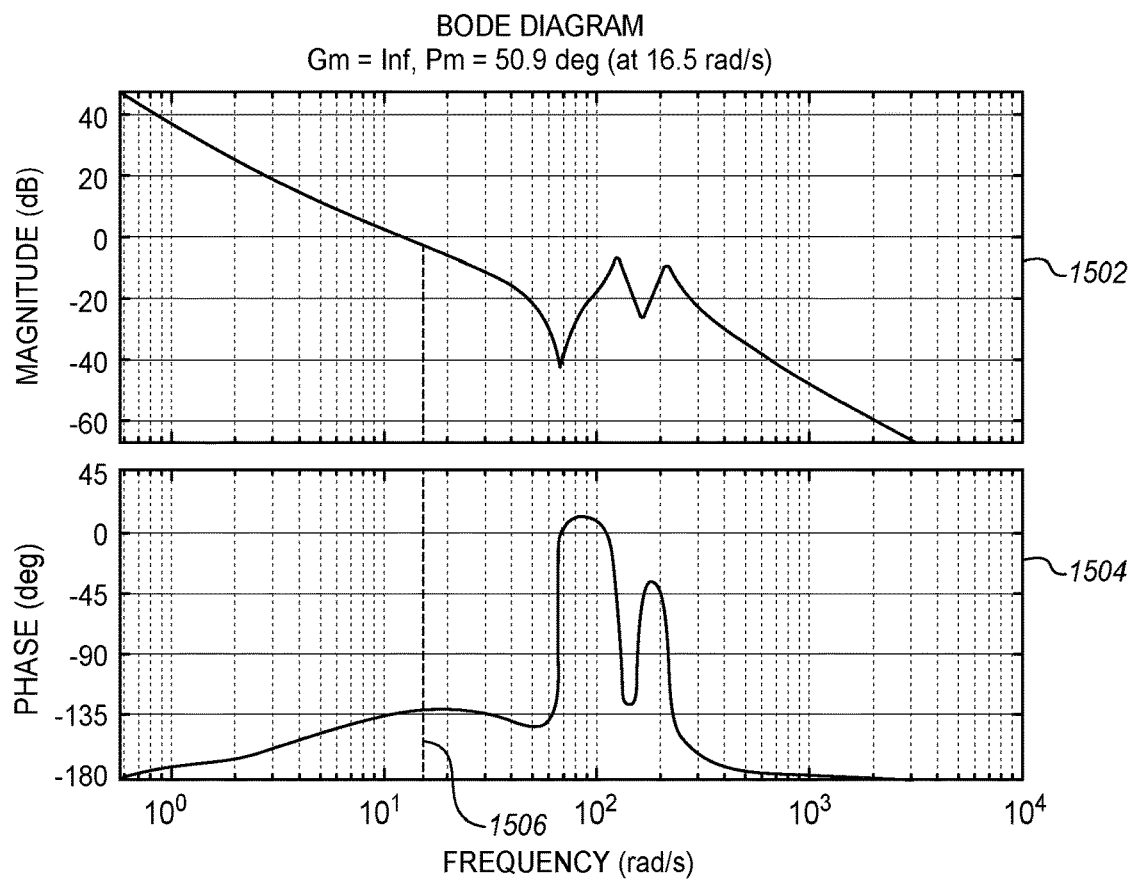
FIG. 15B depicts an open-loop transfer function using the suspension system of FIG. 14 for the model in an illustrative embodiment.

If suspension system 810 coupling battery 808 to center portion 806 is tuned so that its uncoupled response looks like FIG. 14, and dampening is added to suspension system 810, the resulting step response in FIG. 15A and the open-loop transfer function illustrated in FIG. 15B is the result.

FIG. 15A depicts a step response generated using suspension system 810 of FIG. 14 for the model 800 in an illustrative embodiment. FIG. 15B depicts an open-loop transfer function using suspension system 810 of FIG. 14 for the model 800 in an illustrative embodiment. The step response illustrated in FIG. 15A displays little or no ringing, and the gain margin illustrated in plot 1502 remains infinite. The phase margin has improved from 19.9 degrees as illustrated in plot 1304 of FIG. 13B to 51 degrees as illustrated plot 1504 of FIG. 15B (e.g., at line 1506).

FIG. 16 is a flow chart of a method 1600 of operating an aircraft in an illustrative embodiment. The steps of method 1600 will be described with respect to aircraft 500, although method 1600 may apply to other aircraft, not shown. Method 1600 may include other steps, not shown. Further, the steps of method 1600 may be performed in an alternate order.

Consider that aircraft 500 is performing flight operations. Thrust 518 generated by rotor 516 and/or thrust 519 generated by rotor 517 generate flexible modes in airframe 502 (see step 1602). Suspension system 512 operates a mass of battery 508 as a tuned mass damper (see step 1604). Suspension system 512 and the mass of battery 508 dampen the flexible modes generated in airframe 502 during flight operations (see step 1606). The use of suspension system 512 and battery 508 as a tuned mass damper on aircraft 500 operates to reduce the vibrations generated by flexible modes in airframe 502 of aircraft 500, which improves the control bandwidth and/or performance of flight control systems for aircraft 500. Further, when vibrations in airframe 502 are reduced, the payload handling capabilities of aircraft 500 and the performance of vibration sensitive equipment carried by aircraft 500 are also improved.

Although specific embodiments were described herein, the scope is not limited to those specific embodiments. Rather, the scope is defined by the following claims and any equivalents thereof

What is claimed is:

1. An Unmanned Aerial Vehicle (UAV), comprising:
an airframe comprising a central body and arms that extend from the central body;
propulsors coupled to the arms to generate thrust for the UAV, wherein at least one of variable thrust and variable torque from the propulsors cause deflection of one or more of the arms to generate vibration modes in the airframe;
a battery configured to provide electrical power to the propulsors; and
a suspension system that suspends the battery from the central body, and comprising a flexure tuned to operate a mass of the battery as a tuned mass damper to dampen the vibration modes generated in the airframe during flight.

2. The UAV of claim 1, wherein:
the battery is suspended from the airframe proximate to a center of gravity of the UAV.

3. The UAV of claim 1, wherein:
the flexure is compliant in one or more degrees of freedom to dampen the vibration modes generated in the airframe.

4. The UAV of claim 1, wherein:
the flexure is compliant in an axis of pitch of the UAV to dampen the vibration modes generated in the airframe.

5. The UAV of claim 1, wherein:
the suspension system comprises at least one composite structure.

6. The UAV of claim 5, wherein:
the at least one composite structure comprises one or more composite beams.

7. The UAV of claim 6, wherein:
the one or more composite beams include a constrained layer damping treatment applied to one or more surfaces.

8. The UAV of claim 1, wherein each of the propulsors comprises:
an electric motor; and
a rotor mechanically coupled to the electric motor that is configured to generate thrust.

9. The UAV of claim 8, wherein:
at least one of the vibration modes generated in the airframe is perpendicular to a plane of the rotor.

10. The UAV of claim 8, wherein:
at least one of the vibration modes generated in the airframe is in a plane of the rotor.

11. An aircraft, comprising:
an airframe comprising a central body and arms that extend from the central body;
propulsors coupled to the arms to generate thrust for the aircraft, wherein at least one of variable thrust and variable torque from the propulsors cause deflection of one or more of the arms to generate vibration modes in the airframe;
a battery configured to provide electrical power to the propulsors; and
a suspension system that suspends the battery from the central body, and comprising a flexure compliant in one or more degrees of freedom and tuned to operate a mass of the battery as a tuned mass damper to dampen the vibration modes generated in the airframe during flight.

12. The aircraft of claim 11, wherein:
the flexure is compliant in six degrees of freedom to dampen the vibration modes generated in the airframe.

13. The aircraft of claim 11, wherein:
the flexure is compliant in an axis of pitch of the aircraft to dampen the vibration modes generated in the airframe.

14. The aircraft of claim 11, wherein:
the suspension system comprises at least one composite structure.

15. The aircraft of claim 14, wherein:
the at least one composite structure comprises one or more composite beams.

16. The aircraft of claim 15, wherein:
the one or more composite beams include a constrained layer damping treatment applied to one or more surfaces.

17. The aircraft of claim 11, wherein:
each of the propulsors comprises:
an electric motor; and
a rotor mechanically coupled to the electric motor that is configured to generate thrust.

18. The aircraft of claim 17, wherein:
at least one of the flexible modes generated in the airframe is perpendicular to a plane of the rotor.

19. The aircraft of claim 17, wherein:
at least one of the vibration modes generated in the airframe is in a plane of the rotor.

20. A method of operating an aircraft that includes an airframe comprising a central body and arms that extend from the central body, propulsors coupled to the arms, a battery configured to provide electrical power to the propulsors, and a suspension system that suspends the battery from the central body and comprises a flexure, the method comprising:
tuning the flexure of the suspension system to operate a mass of the battery as a tuned mass damper to dampen vibration modes in the airframe generated during flight operations;
generating, during the flight operations, the vibration modes in the airframe due to at least one of variable thrust and variable torque from the propulsors that cause deflection of one or more of the arms;
and
dampening, by the flexure and the mass of the battery, the vibration modes generated in the airframe during the flight operations.

* * * * *